H. H. WELCH.
RECORDING SYSTEM.
APPLICATION FILED MAY 2, 1919.
1,412,586.
Patented Apr. 11, 1922.
2 SHEETS—SHEET 2.
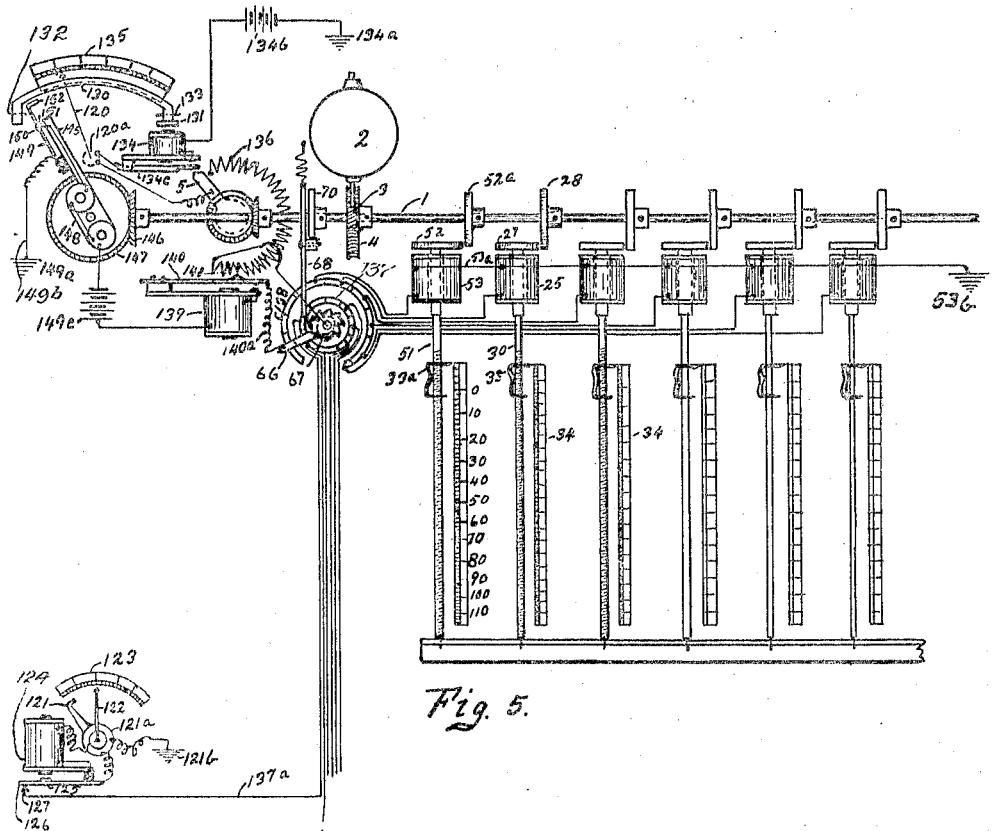
Fig. 5.
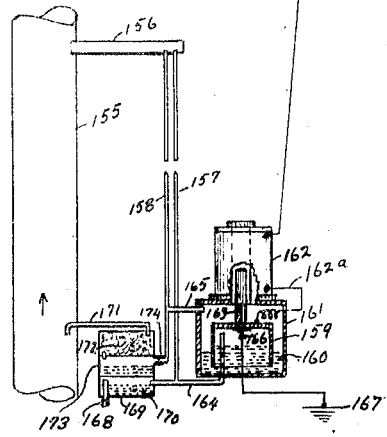
Inventor.
Horace H. Welch
By Walter M. Fuller
Attorney

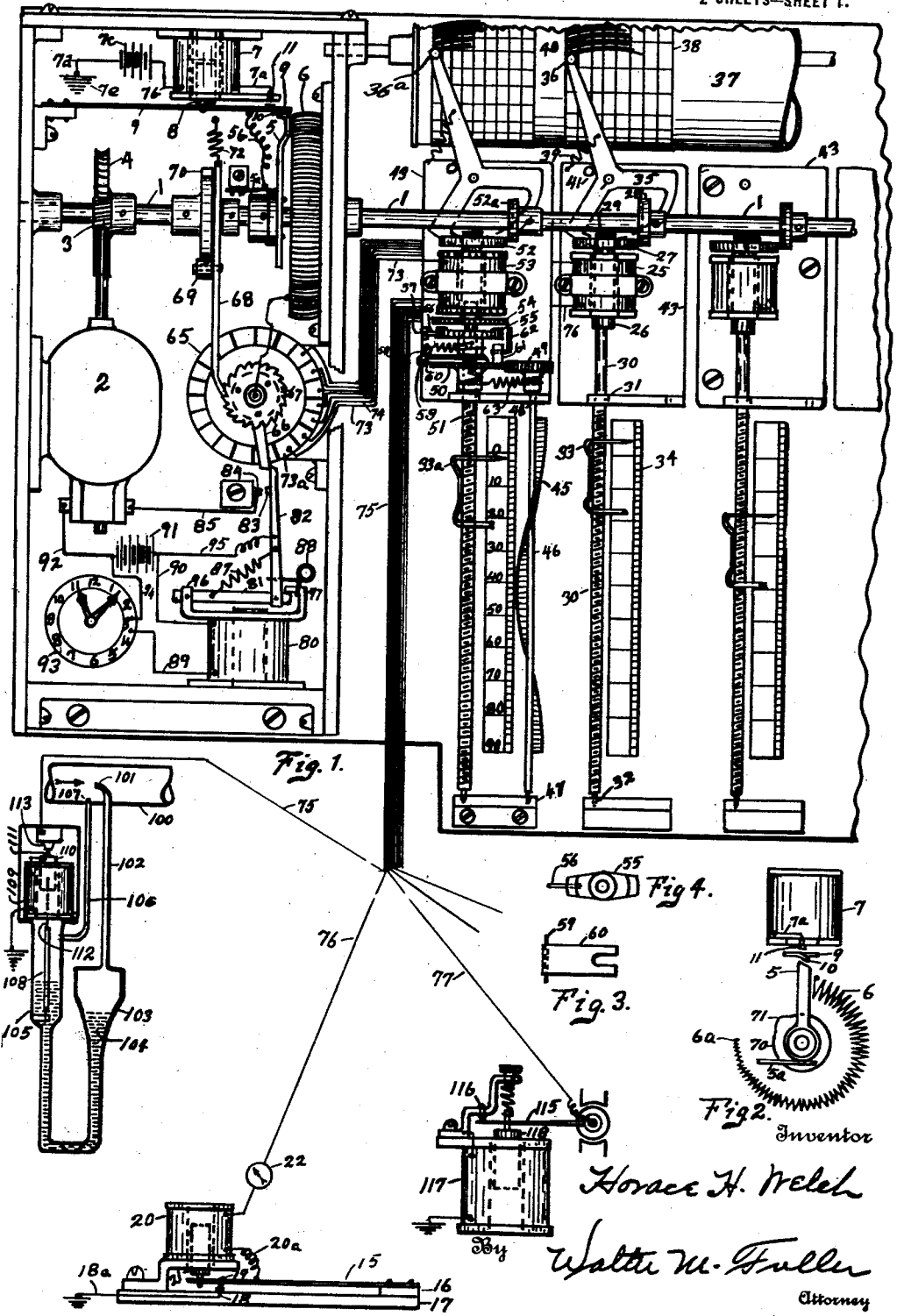

UNITED STATES PATENT OFFICE.

HORACE H. WELCH, OF MILWAUKEE, WISCONSIN.

RECORDING SYSTEM.

1,412,586.	Specification of Letters Patent.	Patented Apr. 11, 1922.

Application filed May 2, 1919. Serial No. 294,256.

*To all whom it may concern:*

Be it known that I, HORACE H. WELCH, a citizen of the United States, residing at Milwaukee, in the county of Milwaukee and State of Wisconsin, have invented certain new and useful Improvements in Recording Systems, of which the following is a specification.

This invention relates to apparatus for measuring, recording, and integrating variable quantities, such as pressure, temperature, flow of fluids, and so forth.

The object of the invention is to provide a simple, inexpensive and systematic means of ascertaining variable quantities, especially where it is necessary to measure a large number of such quantities and to record and integrate the results in convenient form for reference and filing.

Another object is to provide an electrical means of measuring quantities whereby the results of the measurements may be recorded and integrated at a distance from the points at which the measurements are made.

A salient feature of the invention lies in the provision of external power for operating the recording and integrating devices in multiple. This gives a great advantage over the commonly used recorders which require individual clocks for driving each recording sheet. In the system herein described any number of recorders and integrators may be grouped together into a small space and operated from a common source of power, such as an electric motor, and controlled by a single clock.

Briefly described, my system comprises a means of generating a gradually increasing electric current whose intensity quickly becomes equal to a direct multiple of the quantity being measured, and means to record and integrate the final values of the current, the operation being repeated at short intervals, say of one minute each. In other words, a measuring instrument, say a pressure gauge, is employed to create a force proportional to the quantity to be measured, a solenoid and an increasing current is employed to create an equal and opposite force, the current is broken when the equality is attained, and the final value of the forces are recorded and integrated. The cycle of operations is repeated at intervals of one minute. The final values are, of course, expressed in the units of the quantities being measured. If 3 seconds be allowed for each measurement, it is obvious that twenty different quantities may be measured in one minute by using a switching device which will connect the twenty different instruments in succession to a common integrating device.

The many advantages of the system will appear to those skilled in the art. In the following drawings and description the invention is set forth in detail, and in the drawings similar reference characters represent similar elements in all figures.

In the drawings:

Figure 1 is a more or less diagrammatic view of one embodiment of my invention;

Figure 2 is a view showing a plan view of the rheostat and its rotating arm;

Figure 3 shows a plan view of the indicator brake;

Figure 4 shows a plan view of the indicator clutch; and

Figure 5 is a diagrammatic lay-out of a variation in the measuring system.

The main feature of the lay-out shown in Figure 1, is the means for obtaining a gradually increasing electric current whose intensity is proportional to the displacement of a power driven element. 1 is a horizontal shaft driven by a motor 2 through a worm 3 and worm-wheel 4. A rheostat 6 has a sliding contact-arm 5 keyed to shaft 1, but insulated therefrom. The resistance-wire 6 (Figure 2) of the rheostat is wound upon a suitable support of decreasing section so that as the contact-arm 5 rotates in a clockwise direction the resistance will be cut out at a rate necessary to make the intensity of the current passing through the circuit directly proportional to the angular displacement of the arm 5; in other words, equal increments in the angular displacement of 5 represents equal increments of current increase. We have then a means of measuring at a distance. The current can be sent through a conductor to some measuring instrument, there to create a pressure or force equal and opposite to the force to be measured and at the same time we have at a central point an element whose angular displacement is directly proportional to the action of the distant measuring instrument.

Several types of measuring instruments are shown in Figure 1. A temperature measuring device may be made by mounting a strip of thermostatic metal or bi-metal 15 upon an insulated base 16 and 17, in such manner that an increase in temperature will cause an increase in pressure downward or between the two contacts 18 and 19. A solenoid 20, having a core 21, attached to one end of 15, is adapted to separate the contacts 18 and 19 when the current passing through 20 becomes sufficiently strong to overcome the downward pressure of 15. An ammeter 22 may be placed in the circuit at any point, if desired, to indicate the current strength. The recording and integration of the temperature measurements is accomplished by the movement of the shaft 1 during the time required for the current to break the circuit at 18 and 19, as will now be explained.

The integrator consists essentially of an electro-magnetic clutch and a threaded rod which moves a pointer over a scale. Fastened to a plate 43 is an electro-magnet 25 having a loosely fitting core 26. Riveted to the upper end of 26 is a soft iron integrating wheel 27 which is rotated, when it becomes magnetic, by a collar 28 keyed to the rotating shaft 1. 27 normally stands slightly away from 28 owing to the play in the elongated bearing 29 of the core 26. Rigidly connected to 26 is a threaded shaft 30 loosely supported by bearings 31 and 32, and thereon is a pointer 33 consisting of a thin strip of brass bent as shown and having holes drilled larger than the rod 30. The pointer may be easily shifted along the rod 30 for the purpose of resetting by taking hold of the projecting ends and springing ends and springing the thin edges of the holes out of the threads. The pointer 33 rides over a scale 34 the calibration of which will be explained later.

The graphic recording of the measured quantities is accomplished by a marker 36 carried by an arm pivoted at 42, the arm being an extension of the soft iron sector 35 which passes under and very close to the soft iron integrating wheel 27. When 27 becomes magnetic the sector 35 and marker 36 are moved a certain distance while a current is passing through 25. A spring 39 holds 35 normally against a stop 41. The drum 37 is long enough to carry, say 20 individual recording sheets 38 or one large sheet, and is slowly rotated by a train of gears (not shown) from the shaft 1. An indicating attachment may be placed adjacent to each integrating scale if desired, although the current readings of the quantities may be obtained from the length of the lines on the record sheet. The indicator consists of a spiral strip 45 fixed to the shaft 46 which rides in the bearings 47 and 48. To the shaft 46 is fixed a gear 49, the teeth of which mesh with those of another gear 50 loosely mounted upon the integrator-shaft 51 or 30. The object is to rotate the gears 50 and 49 and the spiral strip 45 the same amount that the integrator-wheel 52 rotates for each measurement and to hold the parts 50, 49 and 45 in the advanced position until the next measurement, one minute later. To accomplish this, another soft iron disc 54 is riveted to the core 26. Beneath this and riding loosely on the shaft 51 is a soft iron armature 55 shown in Figure 4 carrying a pin 56 which is normally held against the stop 57 by the spring 58 shown in Figure 1. A pawl 60, illustrated in Figure 3, recessed to straddle the shaft 51 and pivoted upon the pin 59, Figure 1 is adapted to carry the weight of the armature 55 and to press down upon the gear 50 to hold it in position. Such gear 50 is provided with a lug 61 into a hole in which is driven a pin 62 for the purpose of engaging the pin 56 when the latter is rotated. A spring 63 is designed to rotate the gears 49 and 50 backward to the starting point or until the pin 62 rests against part 56. The action is as follows: when disc 54 becomes magnetic, element 55 will be raised and held to the part 54. The gear 50 will then be free to rotate backwards until the pin 62 meets the pin 56 coming forwardly, thus turning parts 50, 49, 46 and 45 to a certain position to indicate the measurement on the scale, the reading being the point at which strip 45 is nearest to the scale. When disc 54 is demagnetized, pin 56 flies back to its stop 57 and the armature 55 rests upon element 60, which in turn holds parts 50, 49 and 45 in their advanced positions. The maximum movement of gear 49 is never more than three-fourths of a turn.

All of the measuring instruments and integrators could be operated simultaneously in this system, but it is preferable to operate them in succession because this puts only a small load upon the source of current at any one time. This may be done by the use of a switch 65 having properly insulated segments over which slides the distributing arm 66. This arm is stepped forward one segment for each revolution of the shaft 1 by means of a ratchet-wheel 67 fastened to 66 and pawl 68 to which is attached a roller 69, the pawl being operated by a cam 70 having a raised portion 71, shown in Figure 2. The cam 70 is keyed to the shaft 1 and the pawl roller is held against the cam by the spring 72. To each of the segments there is connected an electric wire 73, 74, etc., which lead to the integrator-coils 53, 25, etc. From these coils the wires 75, 76, 77, etc., lead to the corresponding measuring instruments 15, etc., placed any distance away, each instrument being grounded.

In order to insure that the circuit will stay broken when once broken by a measuring instrument, a secondary circuit breaker is provided. It consists essentially of a coil 7 having a slidable core 8 riveted to an insulated flat spring 9. The outer end of 9 carries a lug 10, Figure 2, which engages the rheostat arm 5 as the latter passes. 9 is thereby forced upward into contact with 11, thus completing the circuit through 7 which in turn holds up the core 8 and spring 9. When the circuit, which includes 7 and the instrument coil 20, is broken, the spring 9 separates from its contact at 11, thus keeping the circuit open until it is again closed by the arm 5.

The number of measurements made in 24 hours by the instruments is governed by the clock 93. To do this in a simple way the motor 2 is automatically stopped every minute and is started again each minute by the clock, which is of the common variety used in electric time systems, making a momentary electric contact once per minute. The speed of the motor 2 is chosen so that the shaft 1 will rotate about 20 times per minute or once in 3 seconds. Then if there be 19 segments in the switch 65 and 19 teeth in the ratchet-wheel 67, the arm 66 will make one revolution in about 57 seconds; i. e., it will break the motor circuit at 83, 84, by tripping the arm 82 which carries the contact 83, three seconds before the minute has passed. At the beginning of the next minute the clock momentarily closes the circuit from the battery 91, wire 90 to coil 80, wires 89 and 94 to battery. The armature 81 is drawn downward by electro-magnet 80 and arm 82 disengaged from 66. The spring 87 brings 83 into contact with 84, thus starting the motor again through the circuit from battery 91 to motor through 92 and from the motor to the battery through 85, 84, 83, 82, and 95. The armature 81 is pivoted at 96 and held against the stop 97 by the spring 88. The speed of the motor may vary considerably and still the correct number of measurements will be made in 24 hours by the arrangement described in this paragraph.

Any measuring instrument which is adapted to create a pressure proportional to the quantity to be measured may be used in this system. The common flow meter may be adapted as follows: A U-tube 103, 105, containing mercury 104 has the well-known Pitot tube connections 102, 106, 101, 107, to a pipe 100 through which some fluid, such as air, steam, or water flows. The displacement of mercury in the 105 will be directly proportional to the velocity of the fluid in 100 provided the tube 103 is shaped so that the displacement of mercury therein varies as the square of velocity of the fluid in 100; i. e. shaped as a parabola of revolution. If a small rod 108 of carbon, say, be placed in the tube 105 it will be buoyed upward with a force directly proportional to its immersion in the mercury. A solenoid 109 having a core 110 with a contact 111 and connection 112 to the rod 108 is adapted to force the rod 108 downward, when a current of sufficient intensity flows through 109. By this movement of 100 the current is broken at the contacts 111 and 113. The intensity of the current at instant of breaking the circuit is obviously a measure of the displacement of mercury in 105 which in turn is proportional to the velocity of fluid in 100.

Let 115 represent diagrammatically the pointer of any measuring instrument which tends to move clockwise under the influence of the quantity being measured. The effect is to increase the pressure against the contact 116. A solenoid 117 has a core 118 adapted to pull the pointer away from the contact 116 when a current of sufficient strength flows through 117. It thus appears obvious that a great variety of quantities may be measured by this system.

It will be noted that the rheostat 6 extends only over three quarters of a circle. Before the arm 5 leaves the wire at 6ª the measurement has been completed; during the remainder of the turn the cam 71 acts to step the switch arm 66 forward one segment. The resistance of all instrument circuits is the same so that when the rheostat arm 5 forces 9 to contact with 11 and first touches the resistance wire a definite current, say one-third of an ampere, will flow through the coil 7, rheostat 6, integrator solenoid 53 say, and the instrument coil 109. This current is sufficient to energize all of these coils and represents the zero point of instrument, i. e. it is just sufficient to balance the weight of the core 110, and rod 108, to cause the integrating wheel 52 to stick to the collar 52ª and to hold up the core 8 in the coil 7. The complete circuit in this case may be traced as follows: from ground 7ᵉ at upper left-hand corner to wire 7ᵈ to battery 7ᶜ, wire 7ᵇ, coil 7, wire 7ª, contact 11, spring 9, wire 5ᵇ to a suitably mounted brush 5ª, to arm 5, to rheostat 6, 6ª, to switch arm 66, to segment 73ª to wire 73, to integrator coil 53, to wire 75, to instrument coil 109 and to the ground. As the rheostat arm passes over the wire it cuts out resistance and the current increases in direct proportion to the angular displacement of 5 and of the shaft 1. The integrator-wheel 52 being now in contact with 52ª, will be rotated, and the recorder will begin to draw a line. The current continues to increase until broken by the measuring instrument at 111, 113, and at contact 11, the integrator and recorder ceasing to operate at the same instant. This cyle is repeated every minute and it is obvious that at the end of 24 hours the integrator shaft 51 will have been turned a certain number of times, and the pointer 33ª will indicate the sum total of all the measurements for this particular instrument. If the measurement represents "rate of flow," for example, pounds of steam per minute, then the sum of all the measurements multiplied by the proper constants will give the total pounds per 24 hours. The scale is so calibrated that this total quantity is read off directly.

If the mean value is required, as in the case of temperature, the scale is laid out to show the sum of all the measurements divided by 1440, the total number of minutes in 24 hours. The scale will then read in mean value per 24 hours.

At the beginning of a 24-hour run, the pointers 33, 33$^a$, etc. are set at the top of the scale, which, it will be noted, is beyond the zero point. This extra travel for the pointer provides a convenient means for testing the measuring instruments. When any instrument is running idle, i. e., when it breaks the circuit at the zero point, the sum of the movements of the integrating wheel will drive the pointer only to the zero point on scale in 24 hours, thus giving a check upon the accuracy of any given instrument.

In this measuring system, as thus far described, the various measuring instruments are of a type adapted to create a pressure or force proportional to the measured quantity. It is obvious, however, that a type of instrument adapted to give a "displacement" proportional to measured quantity also may be used. For instance, the angular displacement of the pointer that occurs in the galvanometer 22 is the same as the angular displacement of the rheostat arm 5. If the pointer in 22 were arranged to break the circuit when its displacement becomes proportional to the measured quantity, the correct recording and integration would be accomplished in the same way as in the case in which the circuit is broken by the solenoid 20. This point is fully illustrated in the following paragraphs.

Figure 5 represents diagrammatically a slight variation in the system which has the advantage of eliminating the errors due to a change in temperature in the measuring instruments or circuits. The arrangement will be easily understood by keeping in mind the fact that if two galvanometers be placed in the same circuit the displacement of the pointers in the two instruments will be proportional. If the displacement of first pointer is proportional to some quantity to be measured, then the displacement of the second pointer may be used to control the recording and integrating devices. Let 120 represent the pointer of a galvanometer, 121 the pointer of a second galvanometer. Let 122 be the pointer of some measuring instrument and 123 a scale therefor. A gradually increasing current passes through the two galvanometers. 121 moves forward until it touches 122 and completes a circuit through the electromagnet 124 which raises the armature 125 and breaks the circuit at contacts 126, 127. At the same instant the pointer 120, which has moved forward simultaneously with 121, is clamped in its final position by an arm 130 mounted upon pivots 132, 133, and having an armature 131 co-operating with an electro-magnet 134, the latter being in the same circuit as the galvanometers 120 and 121. While the circuit is closed the armature 131 is drawn downwardly and raises the arm 130 clear of the pointer 120; when the circuit is broken the arm 130 clamps 120 against the scale mounting 135, thus indicating for the time being the final value of the current when the circuit was broken.

As in Figure 1 we have a shaft 1 driven by a motor 2 through a worm 3 and worm-wheel 4. Integrating wheels 52, 27, etc., drive the pointers 33$^a$, 33, etc. over scales 34, etc. The rheostat resistance wire 136, however, does not need to be arranged in decreasing increments in this case. The movement of the arm 5 over 136 bears no essential relation to the intensity of the current. There are two independent circuits, one for making the measurement and another for operating the integrators, necessitating the two distributing switches 137, 138, and another circuit breaker 139, similar to 7 in Figure 1. The sectors of the two switches are placed concentric and are served by a common distributing arm 66 which is driven by the ratchet wheel 67, pawl 68, and cam 70, as before. The arm 66 has two sliding contacts insulated from each other for keeping the two circuits separated.

The integration in this modified form is accomplished after the measurement has been made, i. e. after the pointer 120 has been clamped in its final position, as before explained. An arm 145 moves forward from a fixed position until its displacement equals the displacement of 120. The integrators register the movements of 145, the operation being as follows: A bevel gear 146 keyed to shaft 1, drives a soft iron disc bevel 147. A magnetic clutch 148 is mounted on the same stud as 147. The arm 145 is rigid with 148. On 145 is mounted a light insulated spring 149 having contacts 150, 151, and an extension 152 adapted to engage 120. When 148 becomes magnetic the clutch and arm 145 move forward until the circuit is broken at 150, 151, by the movement of 152 against 120. One of the integrator shafts 51 say, whose coil is in the same circuit with 148, is rotated an amount proportionate to the movement of 145. The complete circuit starts from ground 149$^a$ to wire 149$^b$ to 149, 150, 151, 145, to clutch 148, to battery 149$^c$ to coil 139, armature 140, connection 140$^a$, arm 66, switch-segments 138, to integrator coil 53 and wire 53$^a$ to ground 53$^b$. The complete measuring circuit may be traced as follows:

From ground 134$^a$ to battery 134$^b$, coil 134, armature 134ᶜ, to galvanometer 120ᵃ, to arm 5, rheostat 136 to arm 66, to switch segments 137, to line wire 137ᵃ, armature 125, to galvanometer 121ᵃ and to the ground 121ᵇ.

A complete cycle of operations may now be described. The rheostat arm 5, rotating uniformly, lifts the armature 134ᶜ, closing the circuit through the coil 134, galvanometer 120ᵃ, resistance 136 and galvanometer 121ᵃ of the measuring instrument. About one-half ampere now flows through the circuit. This current now gradually increases owing to the decreasing resistance as 5 passes over 136; the two galvanometer pointers 121 and 120 move forward until 121 strikes the measuring instrument pointer 122, thus sending a current through 124 and breaking the circuit at 126, 127. Simultaneously the armature 134ᶜ drops down and the clamp 130 catches and holds the pointer 120. After 5 raises 134ᶜ it closes the second circuit by touching the lug 141 of armature 140. (For convenience in drawing the position of 139 is placed over 180° from 134. It should be about 90°). The arm 145 and one of the integrators now start to move forward until 152 strikes 120, the second circuit being broken at 150, 151. The arm 145 drops back to its starting position against a stop (not shown) and the pawl 68 actuated by the cam 70 steps the arm 66 forward to the next segments. This completes the cycle of operations. (The pointer 120 is released at the beginning of the next cycle or it may be done mechanically by the arm 5 before this time).

It is apparent that instruments of the type shown in Figure 1 that measure by a pressure instead of displacement, may also be used in the lay-out as shown in Figure 5. The increasing current in this case merely passes through a solenoid of the instrument until the circuit is broken, while the galvanometer 120ᵃ measures the final value and the integrators operate as above explained.

An instrument of this type, adapted to measure gas density or the percentage of carbon dioxide in the flue gases, is shown in the lower part of Figure 5. Let 158 and 157 be two vertical pipes, one containing flue-gases and the other containing air at the same pressure and temperature. Both pipes open into another pipe 156, which in turn opens into a flue or furnace chimney 155. The difference in pressure at the lower ends 158 and 157 is a measure of difference in density in the gas columns. To measure this pressure difference an inverted cup 159, partly immersed in oil 160 contained in a closed chamber 161 is provided. 162 is a solenoid having a plunger 163 attached to the cup 159. A pipe 164 connects the space under the cup 159 with the air column 157 while the gas column 158 is connected by a pipe 165 to the closed chamber 161. When the increasing current is sent through the solenoid 162 and wire 162ᵃ to the cup 161 and contact 166 to the ground 167 the current will be broken at 166 when the upward pull of the plunger 163 overbalances the difference in pressure or density between the two gas columns. The galvanometer pointer 120 moves forward at the same time and the integration is accomplished as before. The scale 34 may be graduated to show the mean value of the carbon dioxide percentage for a 24 hour run. The graphic record may be made as in Figure 1.

When flue gas is cooled it is usually saturated with moisture. The error produced from this cause is compensated for by saturating the air column also with moisture. The air flows through a pin hole at 168 into a chamber 169 containing water 170 and then slowly drifts through 157. The gas flows from the stack 155 into the pipe 171 pointed upstream, through a filter 172, through chamber 173 where excess moisture may be precipitated, and into 158 through a throttle 174. In practice the stand pipes 158 and 157 are placed in contact to equalize their temperatures.

The details of this measuring system may be widely changed without departing from the spirit of the invention; and it may be used to measure many quantities other than those suggested. I do not, therefore, wish to be limited by the structures and instruments shown. What I believe to be new and patentable is embodied in the sub-joined claims.

I claim:

1. In a measuring-system, the combination of an electrical circuit, means to generate an electric current of gradually varying intensity, and means to indicate the strength of the current flow at the instant such current equals a definite function of a quantity to be measured, substantially as described.

2. In a measuring-system, means to generate an electric current of gradually increasing intensity, and means to indicate the intensity of the current at the instant the said intensity becomes equal to a definite function of a quantity to be measured, substantially as described.

3. In a measuring-system, means to generate periodically an electric current of gradually increasing intensity, and means to record and integrate the current intensity at the instant the said intensity becomes successively equal to a definite multiple of a quantity being measured, substantially as described.

4. In a measuring-system, means to generate periodically an electric current of gradually increasing intensity, a plurality of measuring instruments adapted to indicate the point at which the said current intensity becomes equal to a definite multiple of the quantities being measured by the said instruments, a switching device adapted to connect each instrument in succession to the source of increasing current, and means to record the said current intensities, substantially as described.

5. In a measuring-system, means to generate periodically an electric current of gradually increasing intensity, a plurality of measuring instruments adapted to indicate the point at which the said current intensity becomes equal to a definite multiple of the quantities being measured by the said instruments, a switching device adapted to connect each instrument in succession to the source of increasing current, and means to record and integrate the said current intensities, substantially as described.

6. In a measuring-system, an electric circuit, means to generate a current of gradually increasing intensity in said circuit, a measuring instrument adapted to break the said circuit when the current intensity becomes equal to a definite multiple of a quantity being measured by said instrument and means to record the final current intensity in said circuit, substantially as described.

7. In a measuring-system, an electric circuit having a source of electro-motive force, a rheostat in said circuit, a measuring instrument having a solenoid in said circuit, a movable core in said solenoid, an element in said instrument controlled by a quantity to be measured, said element adapted to restrain the movement of said movable core, electrical contacts associated with said element and core and adapted to break said circuit, means periodically to gradually decrease the resistance in said rheostat, and means to record the current intensity in said circuit, substantially as described.

8. In a measuring-system, an electric circuit having a source of electro-motive force, a rheostat in said circuit, a measuring instrument having a solenoid in said circuit, a movable core in said solenoid, an element in said instrument controlled by a quantity to be measured, said element adapted to restrain the movement of said movable core, electrical contacts associated with said element and core and adapted to break said circuit, means periodically to gradually decrease the resistance in said rheostat, an electro-magnet in said circuit adapted to open said circuit when de-energized, and an electro-magnetic integrator in said circuit whereby the successive current intensities are integrated, substantially as described.

9. In a measuring-system, an electric circuit, a source of electro-motive force, a power driven element, means to increase the current intensity in said circuit in direct proportion to the increase in displacement of the said element, a measuring instrument adapted to break the said circuit when the current intensity becomes equal to a definite multiple of a quantity being measured, and a recorder operated by the displacement of said element, substantially as described.

HORACE H. WELCH.